Dec. 7, 1948.  E. R. WALTON  2,455,839
FINNED ELECTRIC AIR HEATER

Filed Jan. 18, 1946  2 Sheets-Sheet 1

INVENTOR.
Ernest R. Walton
BY
Fred C. Matheny
ATTORNEY

Dec. 7, 1948.  E. R. WALTON  2,455,839
FINNED ELECTRIC AIR HEATER
Filed Jan. 18, 1946  2 Sheets-Sheet 2

INVENTOR.
Ernest R. Walton
BY
Fred G. Matheny
ATTORNEY

Patented Dec. 7, 1948

2,455,839

UNITED STATES PATENT OFFICE 2,455,839

FINNED ELECTRIC AIR HEATER

Ernest R. Walton, Seattle, Wash.

Application January 18, 1946, Serial No. 641,919

5 Claims. (Cl. 219—38)

This invention relates to a finned electric air heater and an object of this invention is to provide an electric heater of simple and durable construction that is highly efficient in heating circulating air.

Another object is to provide a cast metal electric heating unit that has an electric heating element embedded therein when the unit is cast to thereby provide a close contact between the heating element and the metal of the heating unit so that heat generated by the heating element will be rapidly transferred to the metal heating unit and overheating of the element will be prevented.

Another object is to provide simple and efficient heating units that may be used in multiple to build up an electric heating plant of any desired capacity depending on the number of units that are used and to further provide heating units to which the supply of electric current may be individually controlled irrespective of the number of units in an assembly.

Another object is to provide an electric heating unit having a centrally positioned element carrying portion within which an electric heating element is embedded and having a plurality of thin, flat, spaced apart heat radiating fins extending outwardly from said central portion in planes substantially parallel to the axis of the unit, said fins providing ample heat radiating surface to transfer heat to the air fast enough so that the element carrying portion of the heating unit can operate at a relatively low temperature.

Another object is to provide an electric heating unit of one piece metal construction and of concavo-convex shape having an electric heating element embedded in its central portion and having a peripheral portion formed of thin flat spaced apart radial fins that are inclined toward the direction from which the air approaches the heating unit, said fins affording a large area of heat pick up surface over which the air may pass and said fins tending to converge the air toward the center of the heating unit.

Another object is to provide a heating unit of concavo-convex shape adapted to be positioned horizontally with its concave side downwardly, said unit comprising a central hub portion connected by spaced apart webs with an annular element carrying portion that terminates in thin, flat spaced apart outwardly projecting downwardly inclined heat radiating fins, said element carrying portion having an electric heating element embedded therein and said unit having vertical passageways provided between the hub portion and the body portion through which air may move upwardly and in so doing pick up heat from the central portion of the heating unit Another object of the invention will be apparent from the following description taken in connection with the accompanying drawings.

In the drawings Figure 1 is a top plan view of an electric heating unit constructed in accordance with this invention.

Like reference numerals designate like parts throughout the several views.

Figure 1:
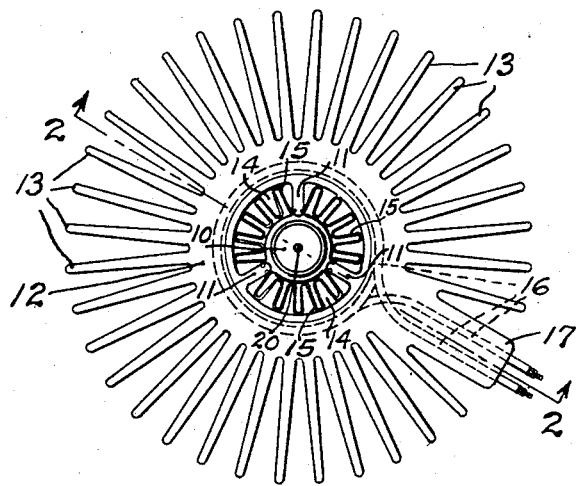
Figure 2:
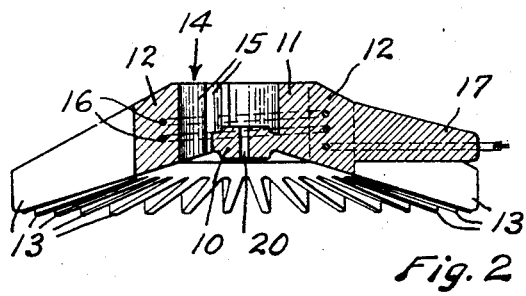
Fig. 2 is a sectional view of the same taken on broken line 2—2 of Fig. 1.

Figs. 1 and 2 show an electric heating unit constructed in accordance with this invention comprising a hub portion 10 connected by integral web members 11 with an annular element carrying portion 12 that has outwardly projecting spaced apart heat radiating vanes or fins 13. Passageways 14 through which air may pass upwardly are provided between the hub portion 10 and the annular body portion 12. Preferably heat radiating members 15 of thin metal bent into corrugated shape are provided in the passageways 14 and secured in any suitable manner to the heating unit. These heat radiating members 15 help to transfer the heat from the heating unit to the air and thus help to maintain a relatively low operating temperature of the heating unit. Three heat radiating members 15 are shown but obviously a greater or less number of said members may be used.

An electric heating element 16 of "Calrod" type is embedded in the annular element carrying portion 12 at the time of casting and the terminal portions of this heating element 16 extend outwardly to the periphery of the heating unit through an arm 17 of solid metal to a location where they may be easily connected with circuit wires. The "Calrod" type element 16 is in the nature of a metal tube having therein a high resistance conductor that is insulated from the tube. Preferably the portion of the electric element 16 that is embedded within the annular element carrying member 12 is in the form of a helical coil as indicated in the drawings.

The heating unit formed by parts 10, 11, 12 and 13 is of concavo-convex shape and in operation the air to be heated is caused to first contact the concave side of the unit. For instance, when the heating unit is mounted in a substantially horizontal position with its concave side downward and its axis substantially vertical then the air will be caused to pass upwardly through said heating unit.

Due to the generally concave shape of the lower side of the heating unit and due to the downward slope of the fins 13 the upwardly moving air will not only pass between the fins 13 but some of this air will be converged toward the center of the heating unit and will pass upwardly through and around the element carrying portion 12, which is the most highly heated portion of the unit, and through the passageways 14. This will help to keep the element carrying portion 12 and element 16 at a relatively low and safe operating temperature.

In constructing a furnace for the heating of air, used for instance in heating a home or a building, a number of these heating units are preferably supported one above another in vertically spaced apart relation by spacer tubes 18. The lowermost tube 18 can be used to support the assembly or said assembly can be supported by other means. When thus supported the several heating units are preferably connected together by means, such as an axially positioned rod 19 that passes through holes 20 in the hubs 10 and through the tubes 18. Preferably the hubs 10 are made with bosses to fit within the ends of the tubes 18.

Figure 3:
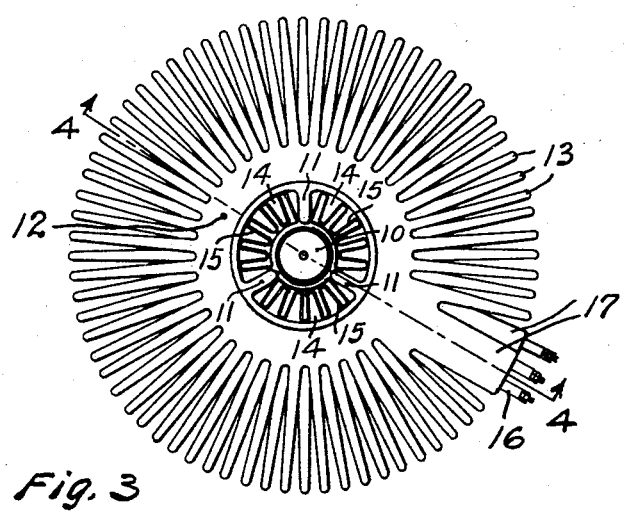
Fig. 3 is a top plan view showing a plurality of these electric heating units assembled in superposed relation.
Figure 4:
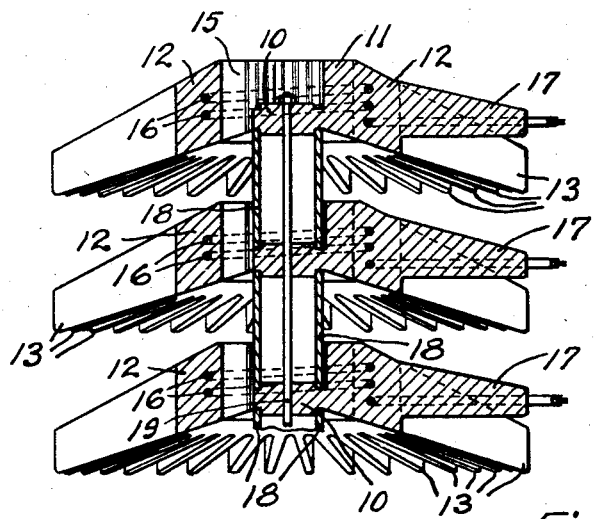
Fig. 4 is a sectional view taken substantially on broken line 4—4 of Fig. 3.

When a plurality of heating units are assembled as shown in Figs. 3 and 4 alternate units are preferably angularly offset enough so that the fins 13 of each unit will be in line with the spaces between fins of adjacent units.

Any suitable housing may be provided around the assembled heating units and air is caused to move upwardly through and past the heating units. The heating elements 16, being cast into each heating unit have very close contact with the metal of the unit and the heat is conducted away from the element very rapidly. The heat radiating fins 13 provide a very large heat radiating surface over which the air is constantly passing. Thus the heat given off by the heating elements will be picked up very quickly by the circulating air and the heating elements will not become over heated. The generally concave shape of the lower sides of the heating units will constantly tend to converge the upwardly moving air toward the center of the units thus efficiently picking up heat from the center portions of the units and keeping these center portions of the units at a relatively low temperature.

Figure 5:
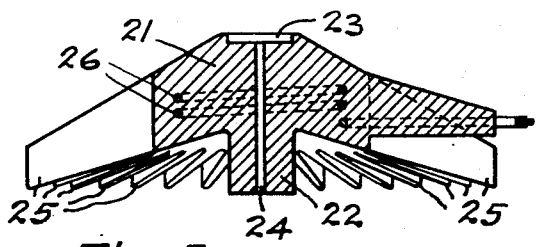
Fig. 5 is a sectional view showing an electric heating unit of modified form.

The heating unit shown in Fig. 5 comprises a central body portion 21 having centrally positioned downwardly projecting integral hub 22 and having a centrally positioned recess 23 on its upper side. The hubs 22 serve as spacers when a plurality of the units shown in Fig. 5 are assembled one above another and the end of each hub except the lowermost one in the assembly 22 rests in the recess 23 of the heating unit next below it. An axial passageway 24 is provided in parts 21 and 22 for an assembly rod similar to the rod 19 of Fig. 4.

The heating unit of Fig. 5 is of concavo-convex shape similar to the units shown in Figs. 1 to 4 and has radial fins 25 and a heating element 26 similar to the fins 13 and heating elements 16 of Figs. 1 to 4. The heating unit of Fig. 5 functions similarly to the heating units of Figs. 1 to 4 except that no centrally positioned air passageways corresponding to passageways 14 are provided in the Fig. 5, structure and the converged air, after contacting the hub 22 and bottom surface of central body portion 21, will pass outwardly around the body portion 21 and upwardly between the fins 26. This will keep the body portion 21 at a relatively low or safe working temperature.

The foregoing description and accompanying drawings clearly disclose preferred embodiments of my invention but it will be understood that changes in the same may be made within the scope and spirit of the following claims.

I claim.

1. A one piece cast metal electric heating unit of relatively flat circular concavo-convex shape, comprising a centrally positioned element carrying portion; an electric heating element embedded in said element carrying portion; and thin flat spaced apart heat radiating fins extending outwardly from said element carrying portion in planes substantially parallel to the axis of said unit and in directions conforming to the concavo-convex shape of said unit, whereby an umbrella shaped finned structure is provided so that air directed against the concave side of said unit will be converged toward the axis thereof.

2. A one piece cast metal electric heating unit of relatively flat circular concavo-convex shape supported in a substantially horizontal plane with its axis substantially vertical, comprising a centrally positioned element carrying portion; an electric heating element embedded in said element carrying portion; and thin flat spaced apart heat radiating fins extending outwardly and downwardly from said element carrying portion in substantially vertical planes, said downwardly inclined fins cooperating to form an umbrella shaped unit which tends to converge ascending air toward said element carrying portion and said fins providing a relatively great heat radiating surface exposed to ascending air.

3. A one piece cast metal electric heating unit of relatively flat circular concavo-convex shape, comprising a concentrically positioned annular element carrying portion; a hub positioned centrally of said element carrying portion; air passageways extending through said element carrying portion around said hub; an electric heating element embedded in said element carrying portion; and thin flat spaced apart heat radiating fins extending outwardly from said element carrying portion in planes substantially parallel to the axis of said unit and in directions conforming to the concavo-convex shape of said unit, said inclined fins cooperating to provide an umbrella shaped structure which tends to converge air that is directed against the concave side of said unit.

4. A cast metal electric heating unit of relatively flat circular concavo-convex shape, comprising an annular element carrying portion; a hub positioned centrally of said element carrying portion; integral webs connecting said element carrying portion and said hub and cooperating therewith to provide air passageways extending through said unit around said hub; separable heat radiating metal members of corrugated shape positioned in said passageways in heat exchanging contact with said element carrying portion; an electric heating element embedded in said element carrying portion; and thin flat spaced apart heat radiating fins extending outwardly from said element carrying portion in planes substantially parallel to the axis of said unit providing an umbrella shaped structure which tends to converge air directed against the concave side thereof toward the more highly heated element carrying portion of said unit.

5. In electric heating means, a plurality of one piece cast metal electric heating units of relatively flat circular concavo-convex shape, each having a centrally positioned element carrying portion, an electric heating element embedded in said element carrying portion and thin flat spaced apart heat radiating fins extending outwardly from said element carrying portion in planes substantially parallel to the axis of said unit; and centrally positioned upright spacer means supporting said heating units one above another in vertically spaced apart relation, the concavo-convex shape of said finned units contributing to the stability of the structure and tending to converge air toward the center thereof.

ERNEST R. WALTON.

REFERENCES CITED

The following references are of record in the file of this patent:

UNITED STATES PATENTS

| Number | Name | Date |
|---|---|---|
| 1,879,019 | Ballentine | Sept. 27, 1932 |
| 1,879,889 | Ballentine | Sept. 27, 1932 |
| 2,109,279 | Soverhill | Feb. 22, 1938 |
| 2,158,602 | Calhoun | May 16, 1939 |